United States Patent
Yang et al.

(10) Patent No.: US 9,935,698 B1
(45) Date of Patent: Apr. 3, 2018

(54) SYSTEM AND METHOD FOR A DYNAMICALLY ACTIVE FD-MIMO ANTENNA ARRAY ADJUSTMENT SYSTEM

(71) Applicant: Verizon Patent and Licensing Inc., Arlington, VA (US)

(72) Inventors: Jin Yang, Orinda, CA (US); Emad M. Abuqabaita, Folsom, CA (US); Michael Kondratiuk, Hillsborough, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/420,724

(22) Filed: Jan. 31, 2017

(51) Int. Cl.
  *H04B 7/04*  (2017.01)
  *H04W 52/34*  (2009.01)
  *H04B 7/0452*  (2017.01)
  *H04B 7/0413*  (2017.01)
  *H04W 16/04*  (2009.01)

(52) U.S. Cl.
  CPC ......... *H04B 7/0469* (2013.01); *H04B 7/0421* (2013.01); *H04B 7/0413* (2013.01); *H04B 7/0452* (2013.01); *H04W 16/04* (2013.01); *H04W 52/343* (2013.01)

(58) Field of Classification Search
  CPC . H04B 7/0452; H04B 7/0413; H04W 52/343; H04W 16/04
  See application file for complete search history.

(56) References Cited

U.S. PATENT DOCUMENTS

| | | | | |
|---|---|---|---|---|
| 9,461,723 | B2* | 10/2016 | Sajadieh | H04L 5/0085 |
| 2012/0165063 | A1* | 6/2012 | Scalia | H04W 52/343 |
| | | | | 455/522 |
| 2014/0113676 | A1* | 4/2014 | Hamalainen | H04W 72/046 |
| | | | | 455/522 |
| 2016/0088522 | A1* | 3/2016 | Lu | H04W 28/20 |
| | | | | 370/235 |

* cited by examiner

*Primary Examiner* — Ross Varndell

(57) ABSTRACT

A network device receives, from a network management system (NMS), a first traffic distribution associated with the FD-MIMO antenna site, and receives a first service reliability requirement associated with the FD-MIMO antenna site. The network device determines, based on physical constraints, a maximum number of a plurality of antenna base blocks that can be placed at a full-dimension multiple input multiple output (FD-MIMO) antenna site, wherein each of the plurality of antenna base blocks includes a plurality of antennas. The network device further determines a first number of antennas to switch into the FD-MIMO antenna site based on the determined maximum number of the plurality of antenna base blocks, the first traffic distribution, and the first service reliability requirement; and causes the first number of antennas to be switched into the FD-MIMO antenna site.

20 Claims, 15 Drawing Sheets

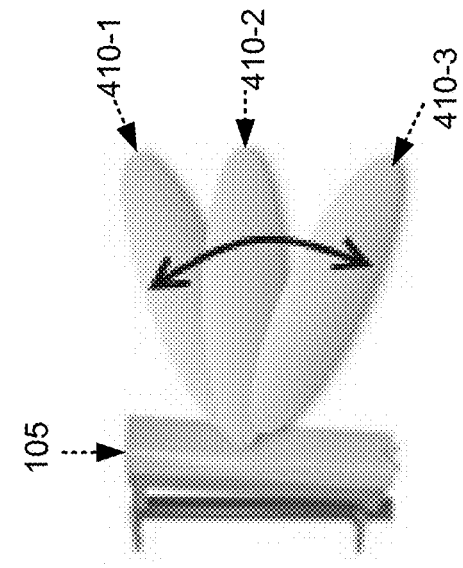
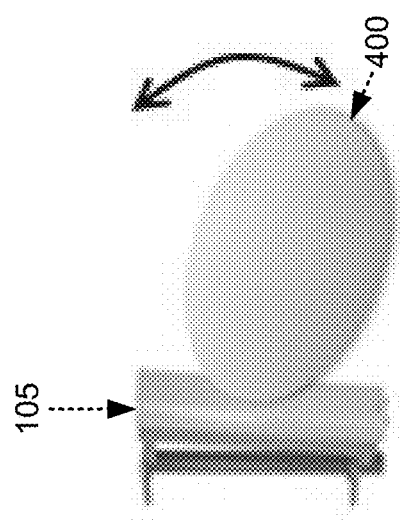
FIG. 4A
FIG. 4B

SYSTEM AND METHOD FOR A DYNAMICALLY ACTIVE FD-MIMO ANTENNA ARRAY ADJUSTMENT SYSTEM

BACKGROUND

Multiple-input and multiple-output (MIMO) is a technique for using multiple transmit and receive antennas to multiply the capacity of a radio link and exploit multipath propagation. MIMO is a component of wireless communication standards such as Wi-Fi (IEEE 802.11n & IEEE 802.11ac), WiMAX (4G) and Long Term Evolution (4G). Full dimension MIMO (FD-MIMO) involves multiple transmit and receive antennas that can form beams in both horizontal and vertical directions such that the beams can cover anywhere in three dimensional space in the vicinity of the multiple antennas.

BRIEF DESCRIPTION OF THE DRAWINGS

FIGS. 4A-4C depict examples of beam forming to create an antenna beam pattern in three dimensions in the vicinity of an antenna array;

DETAILED DESCRIPTION OF THE PREFERRED EMBODIMENTS

The following detailed description refers to the accompanying drawings. The same reference numbers in different drawings may identify the same or similar elements. The following detailed description does not limit the invention, which is defined by the claims.

Exemplary embodiments described herein dynamically adapt the number of horizontal and vertical antennas in a FD-MIMO antenna array based on traffic distributions reported from, for example, a network management system and further based on service reliability requirements reported from, for example, a home subscriber server. Each antenna array, as described herein, may be constructed from modular antenna base blocks that further include modular antenna arrays of standard dimensions. For example, in one implementation, an antenna base block may comprise a two by two (2 rows by 2 columns) array of antennas. Using a 2×2 antenna base block, an FD-MIMO antenna array may be constructed from multiple ones of the antenna base blocks to create, for example, a 4×4 antenna array, a 2×4 antenna array, a 4×2 antenna array, an 8×8 antenna array, etc. At each antenna array site, individual antenna base blocks, and/or individual antennas within each antenna base block, may be selectively switched into, or out of, active use in the antenna array based on reported traffic distributions and reported service reliability requirements. A centralized dynamic active antenna control node may monitor the traffic distributions and service reliability requirements at multiple different antenna array sites, and may issue control commands to cause antenna base blocks and/or individual antennas to be switched into, or out of, active use in each of the multiple different antenna array sites.

Figure 1:
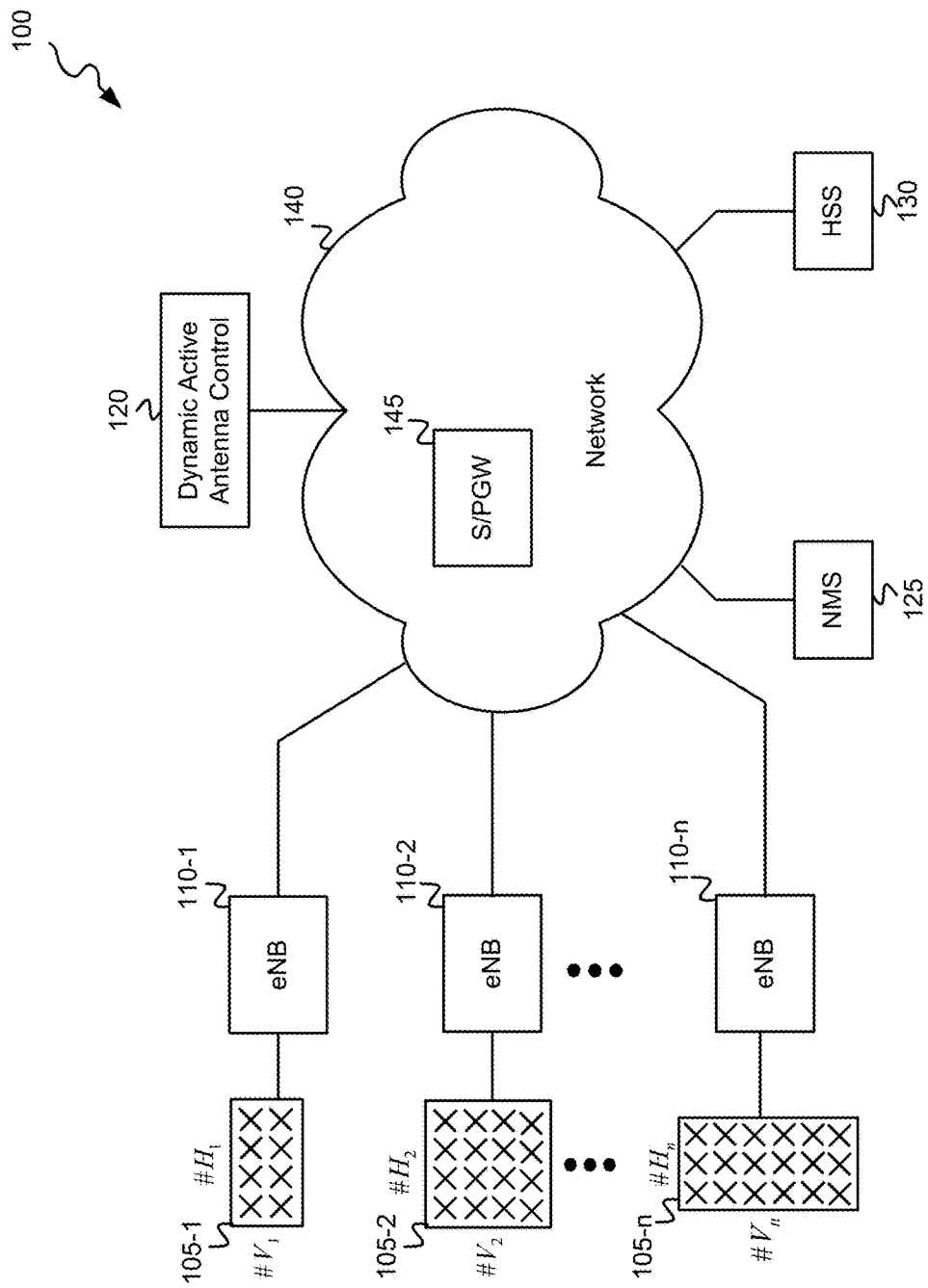
FIG. 1 illustrates an overview of an exemplary network environment in which dynamic active antenna control is employed to selectively control a number of vertical and horizontal antennas that are used at each FD-MIMO antenna array associated with different base stations in a wireless network.

FIG. 1 illustrates an overview of an exemplary network environment 100 in which dynamic active antenna control is employed to selectively control a number of vertical and horizontal antennas that are used at each FD-MIMO antenna array associated with multiple different base stations (e.g., eNodeBs (eNBs)) in a wireless network such as, for example, a cellular wireless network. As shown, network environment 100 includes multiple FD-MIMO antenna arrays 105-1 through 105-$n$ (where n is greater than or equal to one), multiple eNBs 110-1 through 110-$n$, a dynamic active antenna control node 120, a network management system (NMS) 125, a home subscriber server (HSS) 130, and a network 140. As further shown, network 140 may include, among other nodes and network devices, a serving gateway (SGW) or packet data network gateway (PGW) S/PGW 145.

FD-MIMO antenna arrays 105-1 through 105-$n$ (referred to herein as "antenna array 105" or "antenna arrays 105") may each include a FD-MIMO array of antennas that can form antenna beams in both horizontal and vertical directions to enable each array of antennas to cover a three dimensional space in the vicinity of each array. Each antenna array 105 includes a number of horizontal antennas (#H) and a number of vertical antennas (#V) arranged in a row(s) and column(s) configuration. For example, antenna array 105-1 is depicted as a 2×4 (rows by columns) array with the number of vertical antennas (#$V_1$) equaling the number of rows (e.g., 2) and the number of horizontal antennas (#$H_1$) equaling the number of columns (e.g., 4). Additionally, antenna array 105-2 is depicted as a 4×4 (rows by columns) array with the number of vertical antennas (#$V_2$) equaling the number of rows (e.g., 4) and the number of horizontal antennas (#$H_2$) equaling the number of columns (e.g., 4). Further, antenna array 105-$n$ is depicted as a 3×6 (rows by columns) array with the number of vertical antennas (#$V_n$) equaling the number of rows (e.g., 6) and the number of horizontal antennas (#$H_n$) equaling the number of columns (e.g., 3).

eNBs 110-1 through 110-n (referred to herein as "eNB 110" or "eNBs 110") may each include a base station of a Public Land Mobile Network (PLMN), or other type of wireless station, that connects to a respective one of antenna arrays 105-1 through 105-n and controls the transmission and reception of data via a wireless interface. In one implementation, each of eNBs 110-1 through 110-n includes an Evolved Node B of a Long Term Evolution (LTE) PLMN that further includes the hardware that communicates between other nodes of the PLMN and mobile devices (i.e., User Equipments (UEs)) that are located within the antenna beam patterns formed by respective antenna arrays 105-1 through 105-n.

Dynamic active antenna control node(s) 120 may include one or more network devices that perform a process for actively selecting and configuring antennas at antenna arrays 105, for use in transmission and reception, based on service reliability requirements reported from HSS 130 and/or based on traffic distributions reported by NMS 125. Node(s) 120 may perform the process described below with respect to FIGS. 11A and 11B.

NMS 125 includes one or more network devices that monitor the distribution of traffic within network 140, particularly traffic directed to and from each antenna array 105.

HSS 130 includes one or more network devices that support nodes within network 140 that handle calls to and from mobile devices served by a respective antenna array 105 and eNB 110. HSS 130 manages subscriber-related information (e.g., subscriber profiles) that includes, for example, service reliability requirements for each subscriber, and further performs at least a portion of authentication and authorization functions.

A SGW of S/PGW 145 routes and forwards user data from network 140 towards mobile devices (e.g., users) located in proximity to respective eNBs 110, and from mobile devices located in proximity to respective eNBs 110 towards destinations in network 140. A PGW of S/PGW 145 provides connectivity from a mobile device to a packet data network in network(s) 140 and acts as an exit and entry point for traffic for the mobile device. The PGW may perform various other functions, such as, for example, policy enforcement, and packet filtering for each user.

Network 140 may include one or multiple, different networks of various types including, for example, a public land mobile network (PLMN) (e.g., a Code Division Multiple Access (CDMA) 2000 PLMN, a Global System for Mobile Communications (GSM) PLMN, a Long Term Evolution (LTE) PLMN and/or other types of PLMNs), a satellite mobile network, a telecommunications network (e.g., Public Switched Telephone Networks (PSTNs)), a wired and/or wireless local area network (LAN), a wired and/or wireless wide area network (WAN), a metropolitan area network (MAN), an intranet, the Internet, or a cable network (e.g., an optical cable network).

Though not shown in FIG. 1, each of FD-MIMO antenna arrays 105 may transmit to, and receive from, various mobile devices that each includes any type of computational device having one or more communication interfaces for communicating via network 140. The mobile devices may each include, for example, a cellular radiotelephone; a smart phone; a personal digital assistant (PDA); a wearable computer; a desktop, laptop, palmtop or tablet computer; or a media player. Each mobile device may connect to network 140 via a wireless connection. A "user" (also not shown in FIG. 1) may be associated with each mobile device, and may be an owner, operator, and/or a permanent or temporary user of the mobile device.

The configuration of the components of network environment 100 depicted in FIG. 1 is for illustrative purposes only, and other configurations may be implemented. Therefore, network environment 100 may include additional, fewer and/or different components, that may be configured differently, than depicted in FIG. 1. For example, though a single S/PGW 145 is depicted in FIG. 1, multiple S/PGW 145's may reside in network(s) 140.

Figure 2:
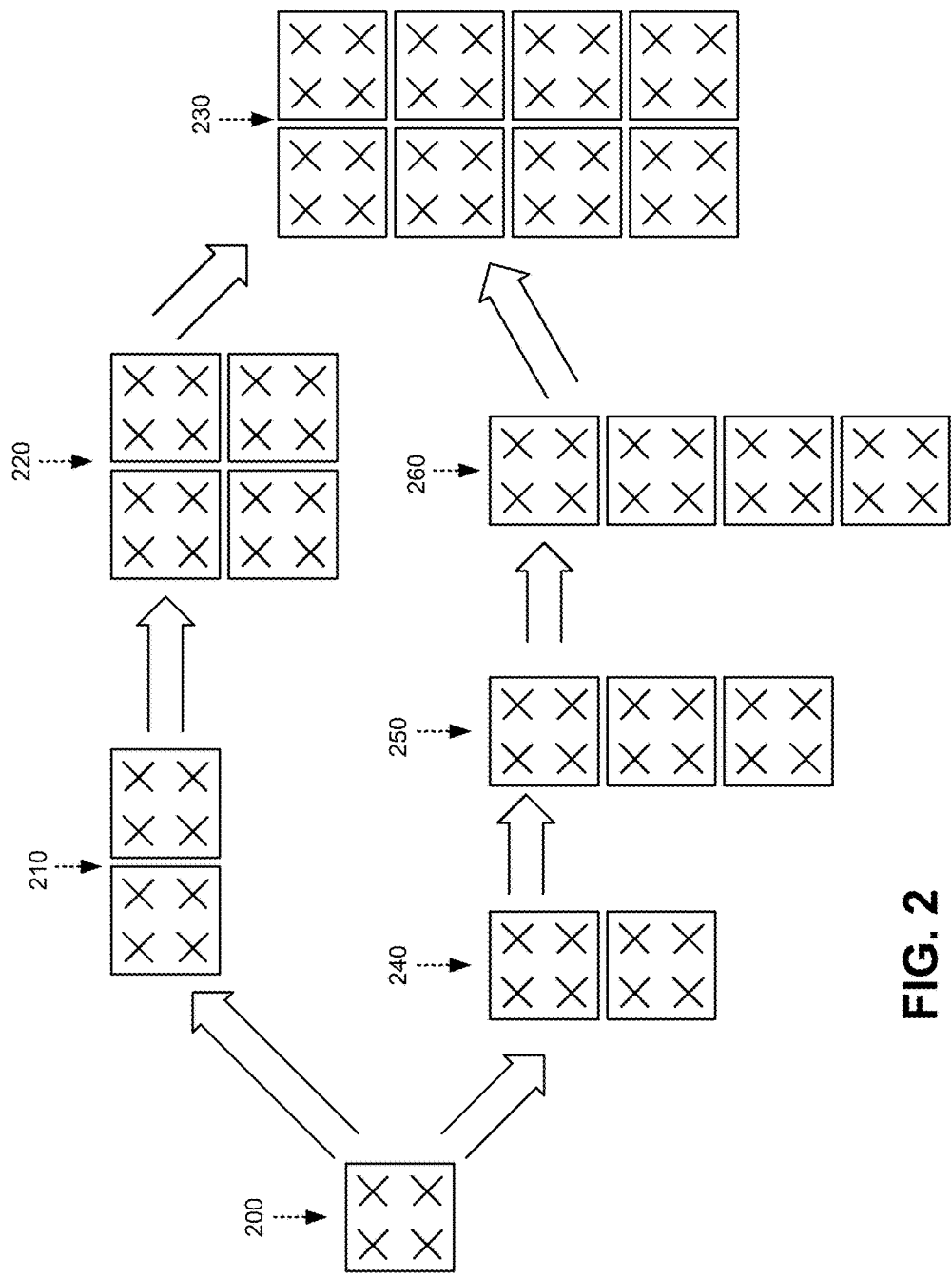
FIG. 2 depicts an example of a FD-MIMO antenna array that is composed of multiple, modular antenna base blocks that can be selectively switched into, or out of, the transmit/receive circuit.

FIG. 2 depicts an example of a FD-MIMO antenna array 105 that is composed of multiple, modular antenna base blocks that can be installed together at an antenna site, where each antenna base block may be selectively switched into, or out of, the transmit/receive circuit. In the example of FIG. 2, a two row by two column (2×2) modular antenna base block 200 is shown as the fundamental base block antenna unit of a FD-MIMO antenna array 105. The 2×2 antenna base block 200 includes a first horizontal row of two antennas, and a second horizontal row of two antennas, where each antenna is also a component of a vertical column of the base block 200. In other implementations, differently sized modular antenna base blocks 200 may be used in a FD-MIMO antenna array 105 such as, for example, a 1×4, a 1×8, a 3×3, or a 4×4 antenna array may serve as a modular antenna base block. Each antenna base block 200 may connect with fiber and ultra-wideband connections to other antenna base blocks 200 within an antenna array 105.

As further shown in FIG. 2, antenna base block 200 may, in a modular fashion, be combined with another antenna base block 200 to create an antenna array 210 that includes two rows and 4 columns (2×4) of antennas. The antenna base block 200 may also be combined, in a modular fashion, with three other antenna base blocks 200 to create an antenna array 220 that includes four rows and four columns (4×4) of antennas. The antenna base block 200 may further be combined, in a modular fashion, with seven other antenna base blocks 200 to create an antenna array 230 that includes eight rows and four columns (8×4) of antennas.

As additionally shown in FIG. 2, antenna base block 200 may, in a modular fashion, be combined with another antenna base block 200 to create an antenna array 240 that includes four rows and two columns (4×2) of antennas. The antenna base block 200 may also be combined, in a modular fashion, with two other antenna base blocks 200 to create an antenna array 250 that includes six rows and two columns (6×2) of antennas. The antenna base block 200 may further be combined, in a modular fashion, with three other antenna base blocks 200 to create an antenna array 260 that includes eight rows and two columns (8×2) of antennas.

Thus, as shown in the examples of FIG. 2, a modular antenna base block 200 may be combined with one or more other antenna base blocks 200 to create an antenna array having a particular, customizable number of horizontal rows and a particular, customizable number of vertical columns of antennas. After installation of multiple modular antenna base blocks 200 at a particular antenna site, each antenna base block 200, and its corresponding antennas, may be selectively switched in, and out of, the transmit/receive circuitry, as described in further detail below. Each antenna base block 200 may, in some implementations, only include antenna radiating elements. In other implementations, such as described with respect to FIG. 7 below, each antenna base block 200 may include the antenna radiating elements and may additionally include an associated transmitter, receiver, and power amplifier (and other components, such as filters, etc). Therefore, in these latter implementations, each modular antenna base block 200 has its own transmitter, receiver, and power amplifier.

Figure 3C:
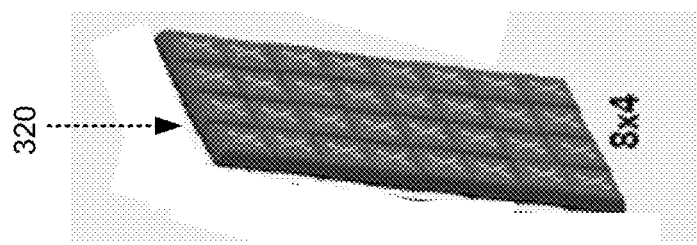
FIGS. 3A-3E depict three dimensional examples of various configurations of FD-MIMO antenna arrays.
Figure 3B:
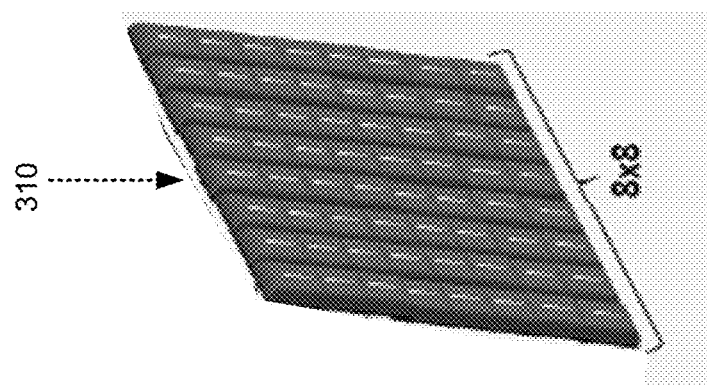
Figure 3A:
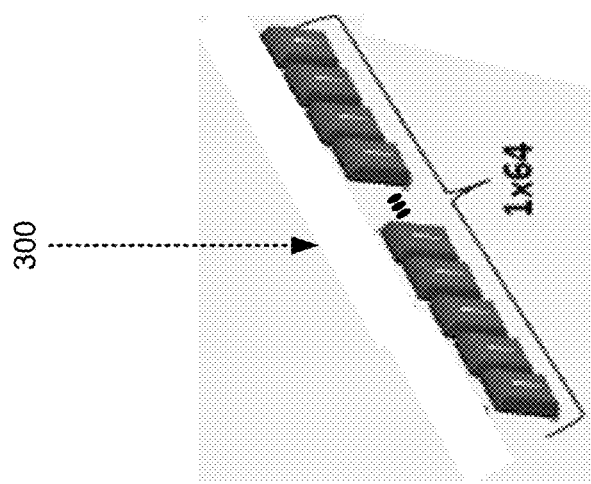
Figure 3E:
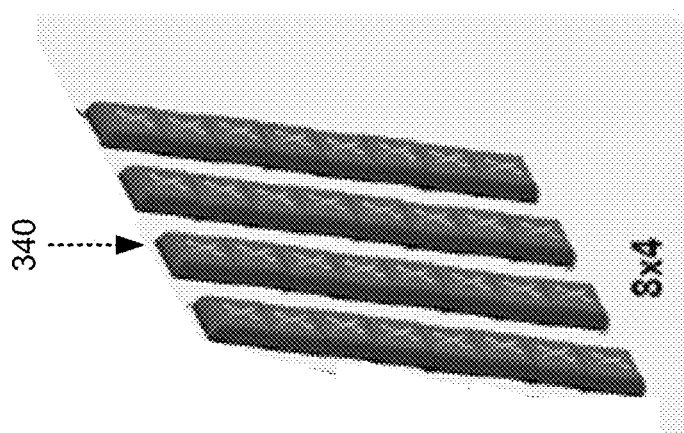
Figure 3D:
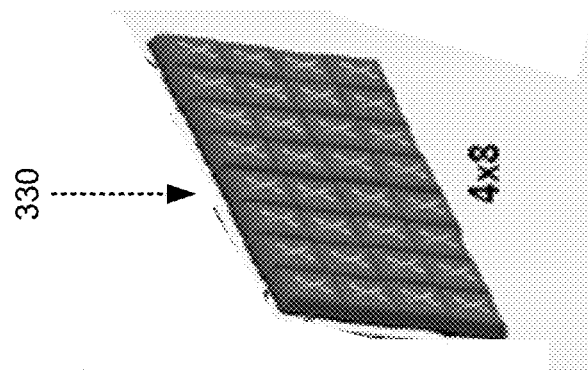

FIGS. 3A-3E depict three dimensional examples of various configurations of FD-MIMO antenna arrays. FIG. 3A depicts an antenna array 300 that includes a single row of sixty four (1×64) antennas. FIG. 3B depicts an antenna array 310 that includes eight rows and eight columns (8×8) of antennas. FIG. 3C depicts an antenna array 320 that includes eight rows and four columns (8×4) of antennas. FIG. 3D depicts an antenna array 330 that includes four rows and eight columns (4×8) of antennas. FIG. 3E depicts an antenna array 340 that includes eight rows and four columns (8×4) of antennas, with a spatial gap between each of the columns of the antennas of the array.

Figure 4C:
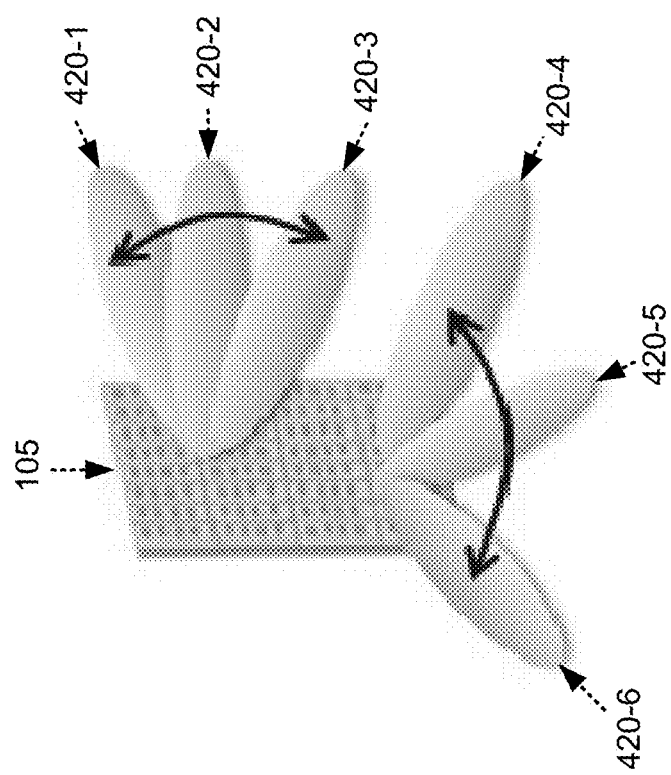

FIGS. 4A-4C depict examples of beam forming to create an antenna beam pattern in three dimensions in the vicinity of an antenna array. The example of FIG. 4A depicts a single antenna beam pattern 400 formed horizontally and vertically by a single antenna in an antenna array 105. Thus, as shown in FIG. 4A, an antenna, such as the antenna residing at the intersection of the third row and second column of the antenna array, may be configured to generate the antenna pattern 400 that extends downwards at a particular angle from the antenna.

The example of FIG. 4B depicts three antenna beam patterns 410-1, 410-2 and 410-3 formed horizontally and vertically by three different antennas in an antenna array 105. As shown in FIG. 4B, three antennas, residing adjacent one another in a single column of the antenna array 105, may be configured to generate a respective antenna beam pattern 410-1, 410-2, and 410-3 at a different angle (i.e., different elevation) relative to the position of each antenna's respective row within the antenna array 105.

The example of FIG. 4C further depicts six antenna beam patterns 420-1, 420-2, 410-3, 420-4, 420-5 and 420-6 formed horizontally and vertically by six different antennas in an antenna array 105. As shown in FIG. 4C, three antennas, residing adjacent one another in a single column of the antenna array 105, may be configured to generate a respective antenna beam pattern 420-2, 420-2, and 420-3 at a different angle (i.e., different elevation) relative to the position of each antenna's respective row within the antenna array 105. As further shown in FIG. 4C, three additional antennas, residing adjacent one another in a single row of the antenna array 105, may be configured to generate a respective antenna beam pattern 420-4, 420-5 and 420-6 at a different angle (i.e., different azimuth) relative to the position of each antenna's respective column within the antenna array 105.

Figure 5:
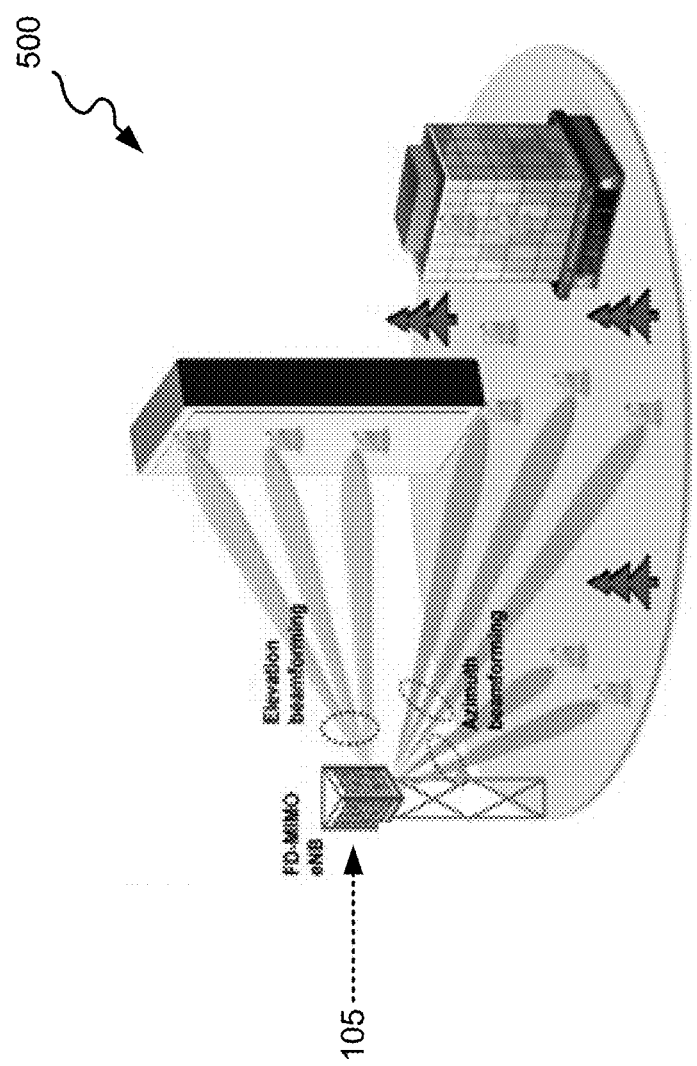
FIGS. 5 and 6 depict an example of a deployment of an antenna array in a three dimensional physical environment.
Figure 6:
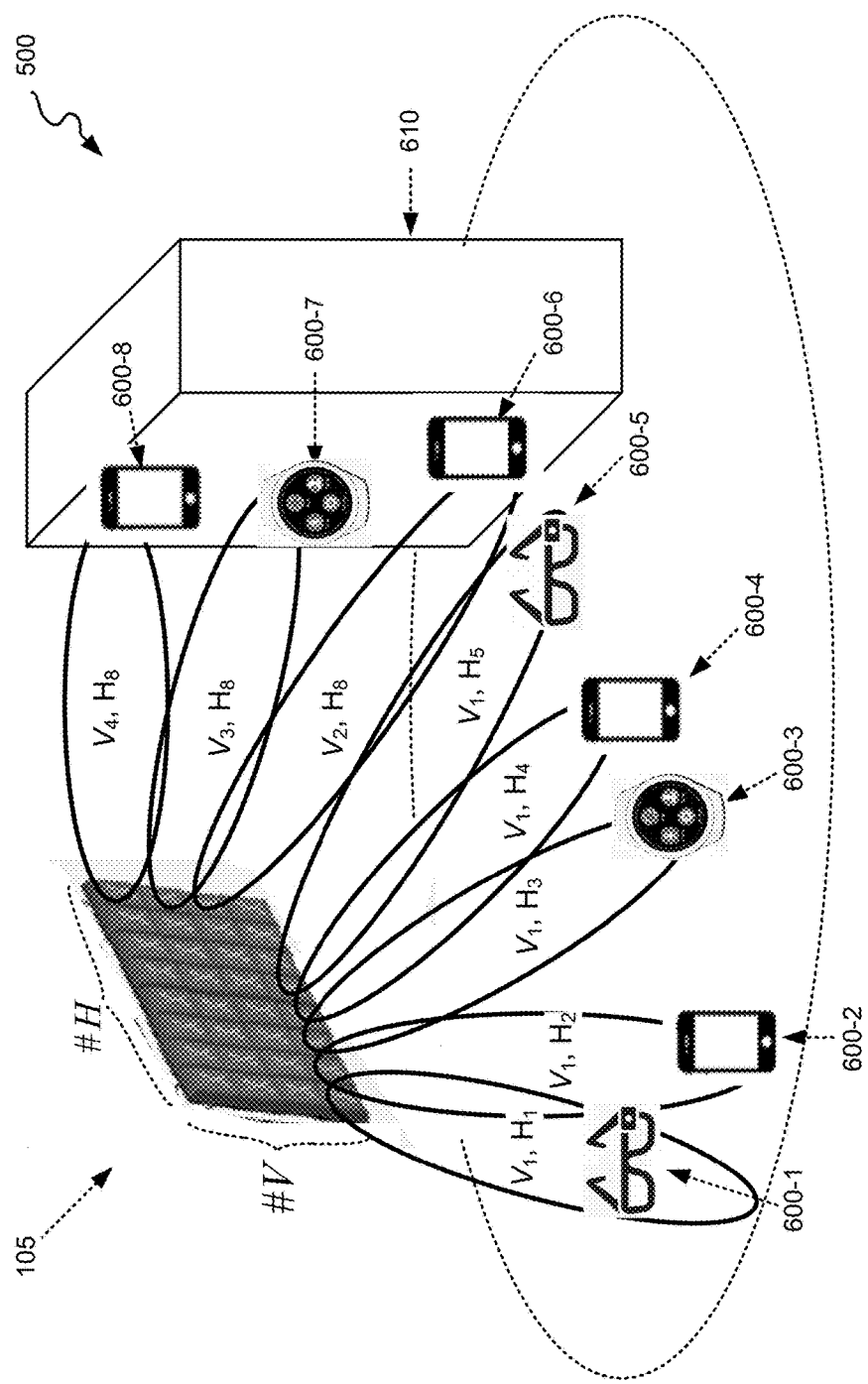

FIGS. 5 and 6 depict an example of a deployment of an antenna array 105 in a three dimensional physical environment 500. As shown in FIGS. 5 and 6, three dimensional physical environment 500 includes various natural and man-made features (e.g., trees and buildings) in which various mobile devices reside and wirelessly receive data via respective antenna beams of antenna array 105. As shown in the detailed view of FIG. 6, mobile devices 600-1 through 600-8 reside within a certain proximity to an antenna array 105 within the three dimensional environment 500. For example, as shown in FIG. 6, mobile devices 600-1, 600-2, 600-3, 600-4, and 600-5 reside at a same elevation, but at a different azimuth, in three dimensional physical environment 500. Mobile device 600-1 receives data via an antenna of antenna array 105 located at $V_1$ and $H_1$. Mobile device 600-2 receives data via an antenna of antenna array 105 located at $V_1$ and $H_2$. Mobile device 600-3 receives data via an antenna of antenna array 105 located at $V_1$ and $H_3$. Mobile device 600-4 receives data via an antenna of antenna array 105 located at $V_1$ and $H_4$. Mobile device 600-5 receives data via an antenna of antenna array 105 located at $V_1$ and $H_5$. Additionally, as shown in FIG. 6, mobile devices 600-6, 600-7 and 600-8 reside at different elevations, but a same azimuth, in three dimensional physical environment 500. Mobile device 600-6 receives data via an antenna of antenna array 105 located at $V_2$ and $H_8$. Mobile device 600-7 receives data via an antenna of antenna array 105 located at $V_3$ and $H_8$. Mobile device 600-8 receives data via an antenna of antenna array 105 located at $V_4$ and $H_8$.

Figure 7:
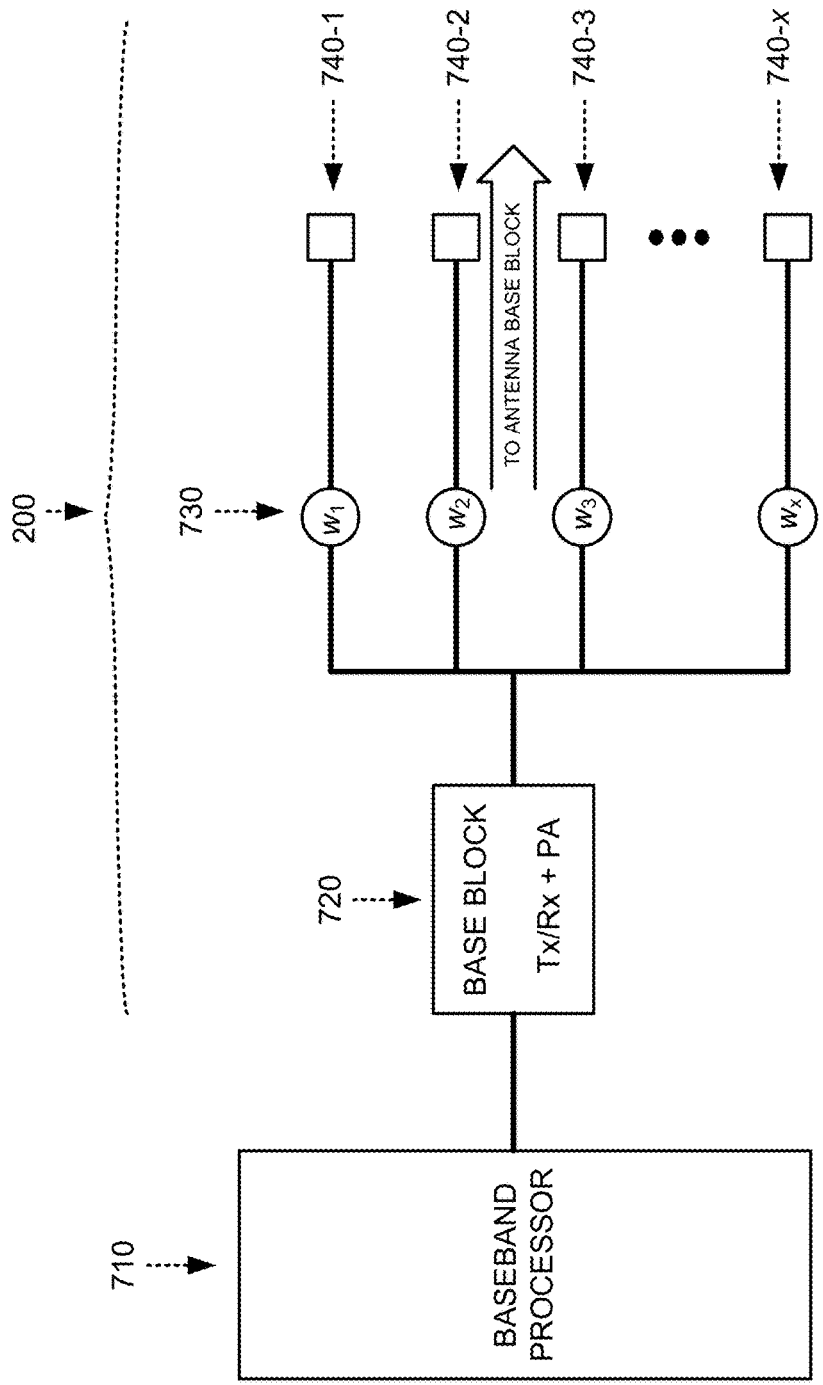
FIG. 7 depicts baseband processing components of an eNodeB and transmitter/receiver and power amplification components associated with an antenna base block, according to an exemplary implementation.

FIG. 7 depicts baseband processing components of an eNB 110 and transmitter/receiver and power amplification components associated with an antenna base block 200, according to an exemplary implementation. As shown, a baseband processor 710 of the eNB 110 connects to components associated with a single antenna base block 200. The components of the antenna base block 200 include a block transmitter/receiver and power amplifier (Tx/Rx+PA) 720, a weight vector 730, and multiple connectors 740-1 through 740-x for connecting to respective antennas 1 through x of an antenna base block 200. Thus, in the exemplary implementation depicted in FIG. 7, each antenna base block 200 includes its own corresponding base block Tx/Rx+PA 720, weight vector 730, and connectors 740.

Baseband processor 710 of eNB 110 includes a device (e.g., a chip or part of a chip) in a network interface that manages radio functions that require use of antenna array 105. Baseband processor 710 may include, in addition to other components, its own memory and software/firmware components.

Base block Tx/Rx+PA 720 may include a transmitter for transmitting via one or more antennas of an antenna base block 200, a receiver for receiving via one or more antennas of the antenna base block 200, and a power amplifier for amplifying signals transmitted, or received, via antennas of the antenna base block 200. Weight vector 730 includes a device(s) for applying x weighted values to signals transmitted or received via x antennas of an antenna base block 200. Connectors 740-1 through 740-x each include a connector mechanism for electrically connecting a respective antenna of antenna array 105 to a respective weight vector 730.

The configuration of the components of eNB 110 and antenna base block 200 depicted in FIG. 7 is for illustrative purposes only, and other configurations may be implemented. Therefore, eNB 110 or antenna base block 200 may include additional, fewer and/or different components, that may be configured differently, than depicted in FIG. 7.

Figure 8:
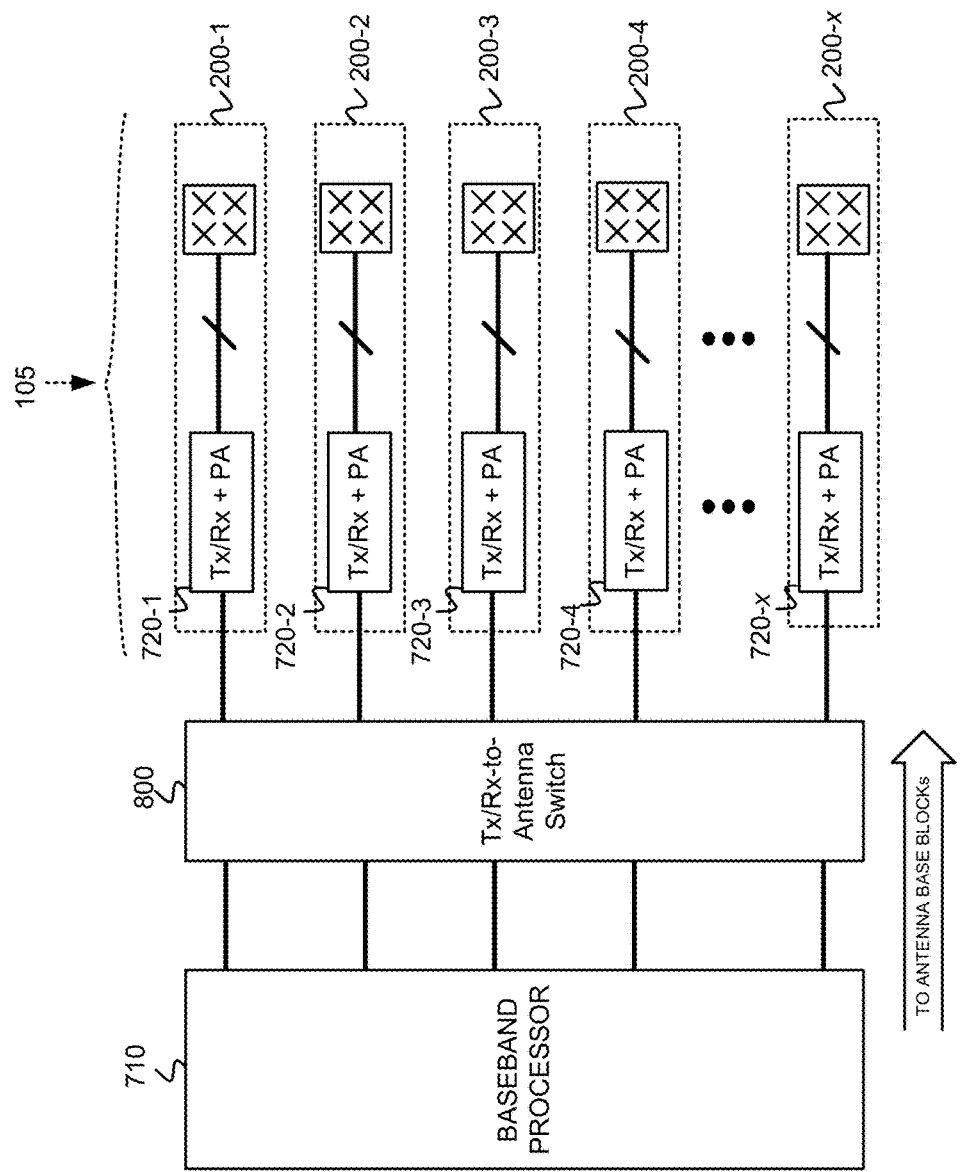
FIG. 8 depicts the baseband processing components of an eNodeB and transmitter/receiver and power amplification components associated with multiple antenna base blocks configured as an antenna array, according to an exemplary implementation.

FIG. 8 depicts the baseband processing components of an eNB 110 and transmitter/receiver and power amplification components associated with multiple antenna base blocks 200 configured as an antenna array 105, according to an exemplary implementation. As shown, baseband processor 710 connects to a Tx/Rx-to-Antenna Switch 800 which, in turn, connects to multiple antenna base blocks 200-1 through 200-x of an antenna array 105. Switch 800 switches one or more selected antenna base blocks through to baseband processor 710 based on, for example, instructions received from dynamic active antenna control node 120.

For example, switch 800, based on instructions from node 120, may switch signals received via antenna base block 200-1, and signals received via antenna base block 200-4, through to baseband processor 710. As another example, switch 800, based on instructions from node 120, may switch first outgoing signals from baseband processor 710 to antenna base block 200-2, and second outgoing signals from baseband processor 710 to antenna base block 200-3.

Though FIG. 8 depicts switch 800 being used for switching entire antenna base blocks 200 in and out of the antenna array 105, switch 800 may include switching functionality for switching individual antennas within each antenna base block 200 in and out of the antenna array 105 in addition to, or instead of, switching entire antenna base blocks 200 in and out of the antenna array 105.

Figure 9:
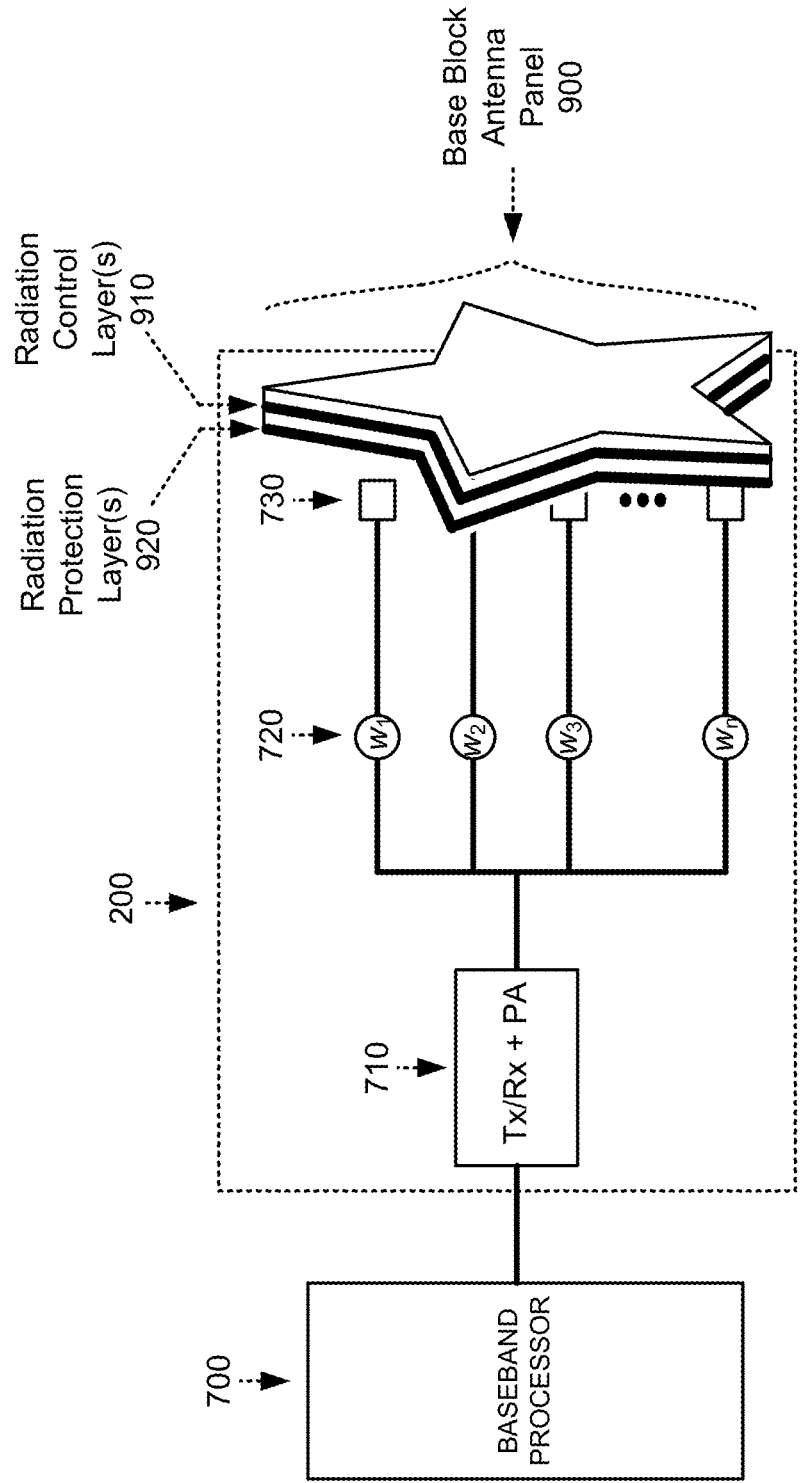
FIG. 9 depicts a base block antenna panel that can be associated with each antenna base block.

FIG. 9 depicts a base block antenna panel 900 that can be associated with each antenna base block 200. Base block antenna panel 900 can have different shapes and sizes designed to fit and camouflage in various different antenna array deployment scenarios. For an antenna array 105 comprising multiple different base block antennas 200, the shape and size of each base block antenna panel 900 may enable them to fit together, in puzzle-like fashion, resulting an overall shape and size of the antenna array 105 that fits within the antenna placement area of the particular deployment location. As shown in FIG. 9, base block antenna panel 900 of the antenna base block 200 includes a radiation control layer(s) 910 and a radiation protection layer(s) 920. Radiation control layer(s) 910 shapes a radiation pattern associated with the antenna base block 200. Radiation protection layer(s) 920 serve to shield radiation and interference with other cells. Each base block antenna panel 900 may have a particular size and shape such that, when interconnected with other base block antenna panels 900, the resulting antenna array 105 can have a customized size and shape that fits within a particular antenna placement area and exhibits particular radiation control and radiation protection characteristics.

Figure 10:
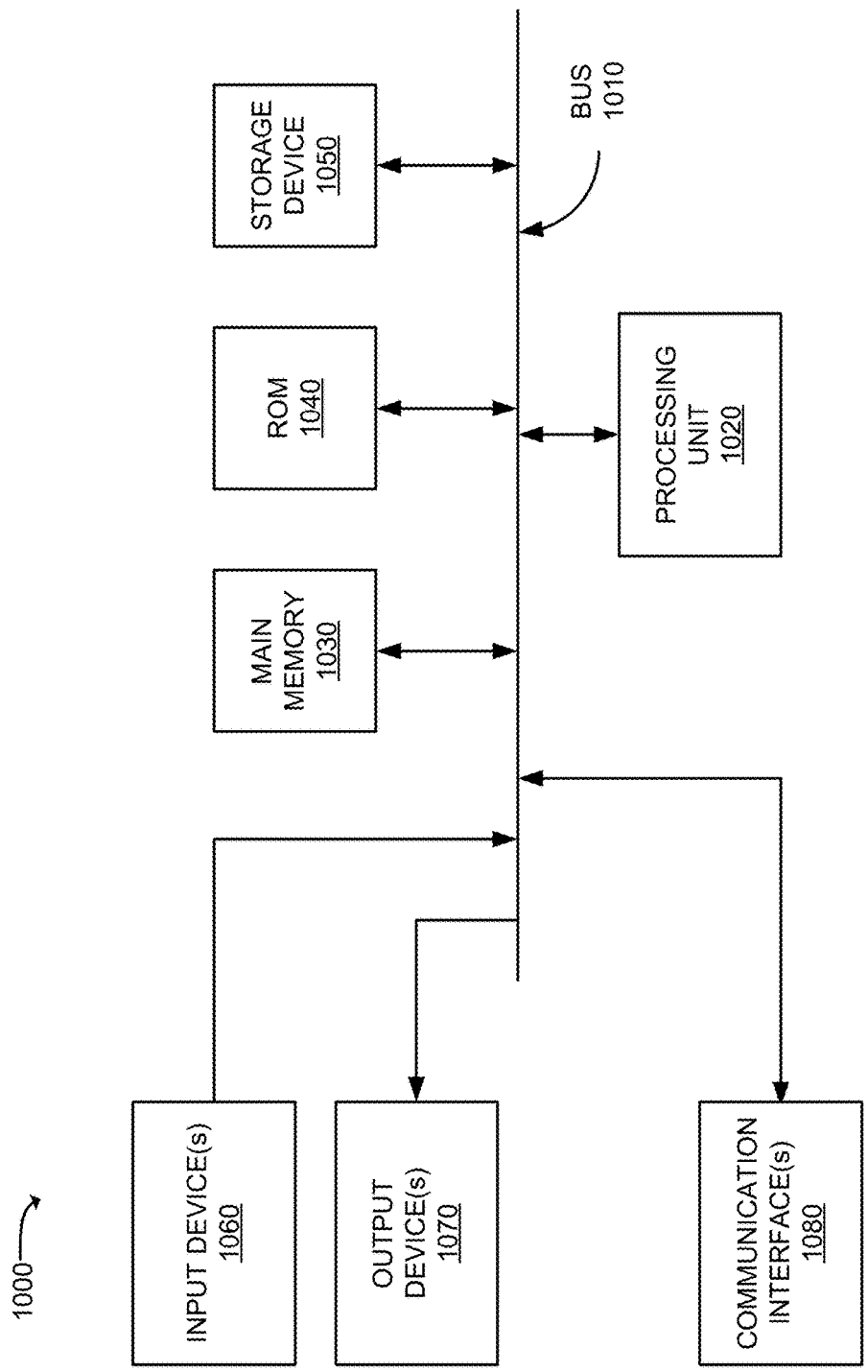
FIG. 10 is a diagram that depicts exemplary components of a device that may correspond to the dynamic active antenna control node, network management system, home subscriber server, serving/packet data gateway or eNodeBs of FIG. 1.

FIG. 10 is a diagram that depicts exemplary components of a device 1000. Dynamic active antenna control node 120, NMS 125, HSS 130, S/PGW 145, and eNBs 110 may each include the same, or similar, components to those of device 1000 shown in FIG. 10.

Device 1000 may include a bus 1010, a processing unit 1020, a main memory 1030, a read only memory (ROM) 1040, a storage device 1050, an input device(s) 1060, an output device(s) 1070, and a communication interface(s) 1080.

Bus 1010 includes a path that permits communication among the components of device 1000. Processing unit 1020 may include one or more processors or microprocessors, or processing logic, which may interpret and execute instructions. Main memory 1030 may include a random access memory (RAM) or another type of dynamic storage device that may store information and instructions for execution by processing unit 1020. ROM 1040 may include a ROM device or another type of static storage device that stores static information and instructions for use by processing unit 1020. Storage device 1050 may include a magnetic and/or optical recording medium. Main memory 1030, ROM 1040 and storage device 1050 may be a "tangible and/or non-transitory computer-readable medium."

Input device(s) 1060 may include one or more mechanisms that permit a user to input information to device 1000, such as, for example, a keypad or a keyboard, a display with a touch sensitive panel, voice recognition and/or biometric mechanisms, etc. Output device(s) 1070 may include one or more mechanisms that output information to the user, including a display (e.g., with a touch sensitive panel), a speaker, etc. Input device(s) 1060 and output device(s) 1070 may be implemented as a graphical user interface (GUI) (e.g., a touch screen GUI that uses any type of touch screen device) that displays GUI information and which receives user input via the GUI. Communication interface(s) 380 may include a transceiver that enables device 1000 to communicate with other devices and/or systems. For example, communication interface(s) 1080 may include wired and/or wireless transceivers for communicating via network 140.

The configuration of components of device 1000 shown in FIG. 10 is for illustrative purposes. Other configurations may be implemented. Therefore, device 1000 may include additional, fewer and/or different components, arranged in a different configuration, than depicted in FIG. 10. For example, in the case where device 1000 is dynamic active antenna control node 120, NMS 125, or HSS 130, then input device(s) 1060 and/or output device(s) 1070 may be omitted.

Figure 11A:
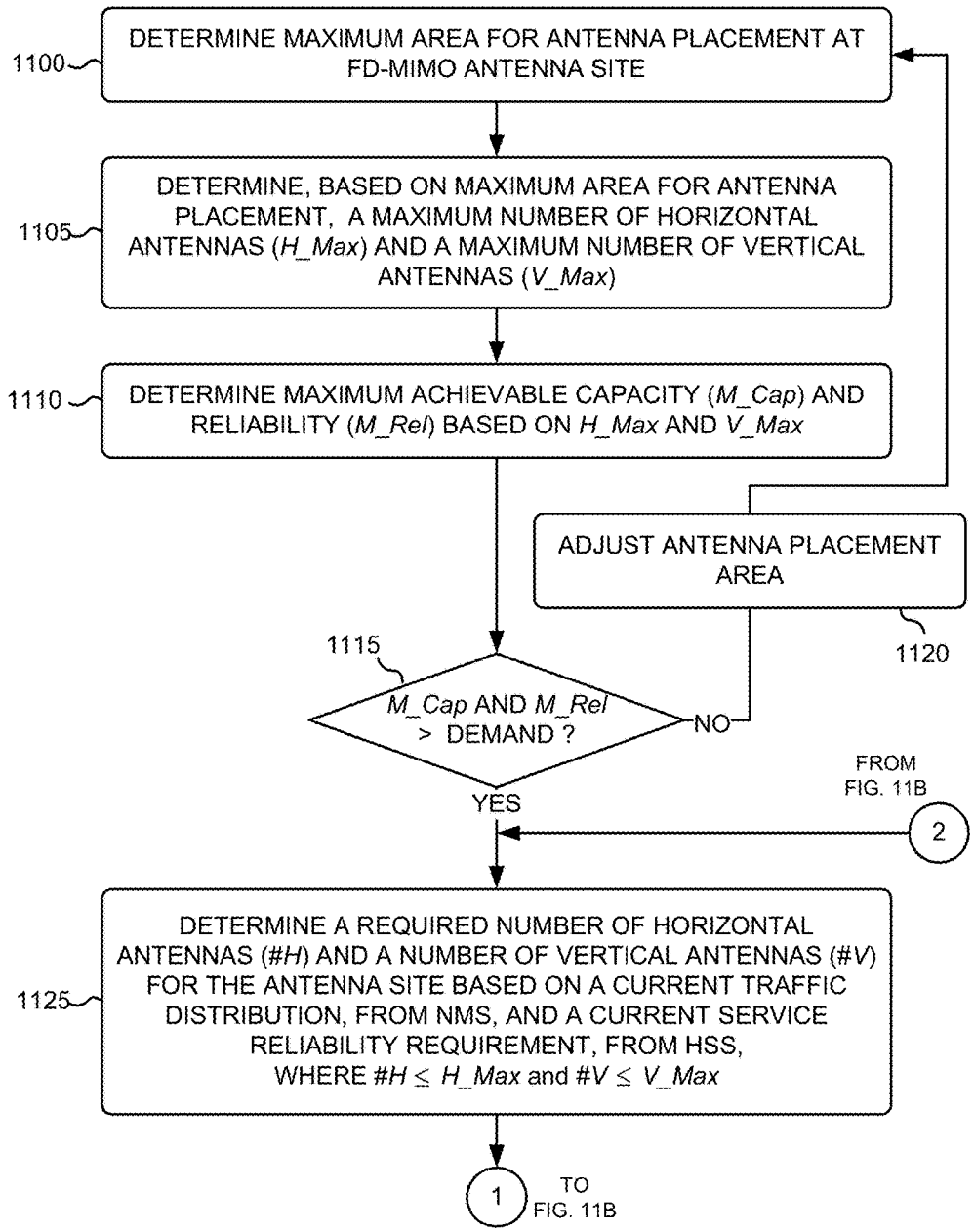
FIGS. 11A and 11B are flow diagrams that illustrate an exemplary process for selectively switching antennas in and out of an antenna array based on current traffic distributions and current service reliability requirements.
Figure 11B:
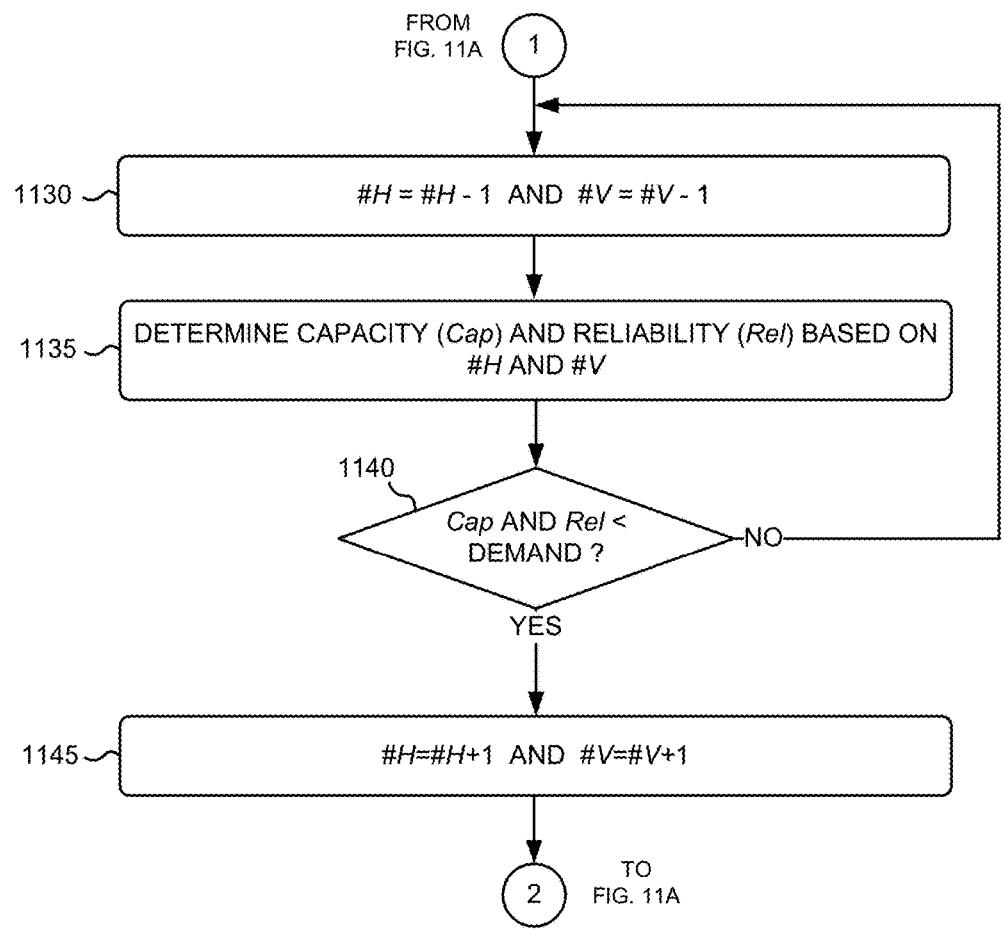

FIGS. 11A and 11B are flow diagrams that illustrate an exemplary process for selectively switching antennas in and out of an antenna array 105 based on current traffic distributions and current service reliability requirements. The exemplary process of FIGS. 11A and 11B may be implemented by dynamic active antenna control node 120, in conjunction with NMS 125, HSS 130, and one or more antenna arrays 105.

The exemplary process includes dynamic active antenna control node 120 determining a maximum area for antenna placement at a FD-MIMO antenna site (block 1100). The deployment location for the FD-MIMO antenna site may include a maximum physical area into which the antenna array may be placed. The maximum physical area may be constrained by surrounding objects (e.g., buildings) or by the antenna site itself (e.g., antenna mast having a limited number of array mounting locations). Additionally, a minimum required area for antenna placement can be determined based on a network traffic forecast for the geographic coverage area serviced by the antenna array 105.

Dynamic active antenna control node 120 determines, based on the maximum area for the antenna placement, a maximum number of horizontal antennas (H_Max) and a maximum number of vertical antennas (V_Max) (block 1105). The antenna array 105 to be disposed at the antenna site may have a maximum number of horizontal antennas H_Max and a maximum number of vertical antennas V_Max that fit within the maximum area for placement of the antenna array. For example, the determined maximum number of horizontal antennas may be 12 and the maximum number of vertical antennas may be 15. Therefore, if the antenna base block in use includes a 3×3 base block, then the antenna array 105 includes a 4×5 array of antenna base blocks (i.e., 4 antenna base blocks in width, and 5 antenna base blocks in length). The maximum number of horizontal and/or vertical antennas may additionally constrained by resource constraints. Such resource constraints may include, for example, availability of only a certain number of antenna base blocks 200 (i.e., only a certain number currently "in stock" for placement at the antenna site), availability of a certain number of transmitters, receivers, or power amplifiers, etc.

Dynamic active antenna control node 120 determines a maximum achievable capacity (M_Cap) and maximum achievable reliability (M_Rel) based on H_Max and V_Max (block 1110). Based on the known characteristics of each antenna base block 200, the maximum achievable capacity M_Cap and the maximum achievable reliability M_Rel may be calculated for the entire antenna array 105. The maximum achievable capacity may be based on the available bandwidth of each antenna base block 200. The maximum achievable reliability may be based on the maximum throughput and/or latency associated with each antenna base block 200]. In one implementation, the maximum achievable reliability can be determined as a percentage of time that data can be transmitted from the antenna array 105 at a required throughput, latency, and/or a maximum number of dropped calls, across a geographic coverage area associated with the antenna array 105. For example, a maximum achievable reliability may be 99.99% of data transmitted, via the antenna array 105, with a maximum of 100 ms of latency, a minimum throughput of 1 Mbps and/or with less than 1% of dropped calls.

Dynamic active antenna control node 120 determines if M_Cap and M_Rel are greater than demand (block 1115). Dynamic active antenna control node 120 may request a report of the current demand, from NMS 125, for the geographic area serviced by the antenna array 105. The demand may include a minimum capacity and a minimum reliability required by mobile devices being serviced by the antenna array within the geographic area. If M_Cap and M_Rel do not exceed the demand (NO—block 1115), then the antenna placement area is adjusted (block 1120), and the exemplary process returns to block 1100. Adjustment of the antenna placement area may include automatic or manual (e.g., human) intervention, where, for example, additional mounting mechanisms may be attached to the mast of the antenna site. The additional mounting mechanisms may, for example, permit additional antenna base blocks 200 to be mounted to the antenna mast at the antenna site.

Figure 12:
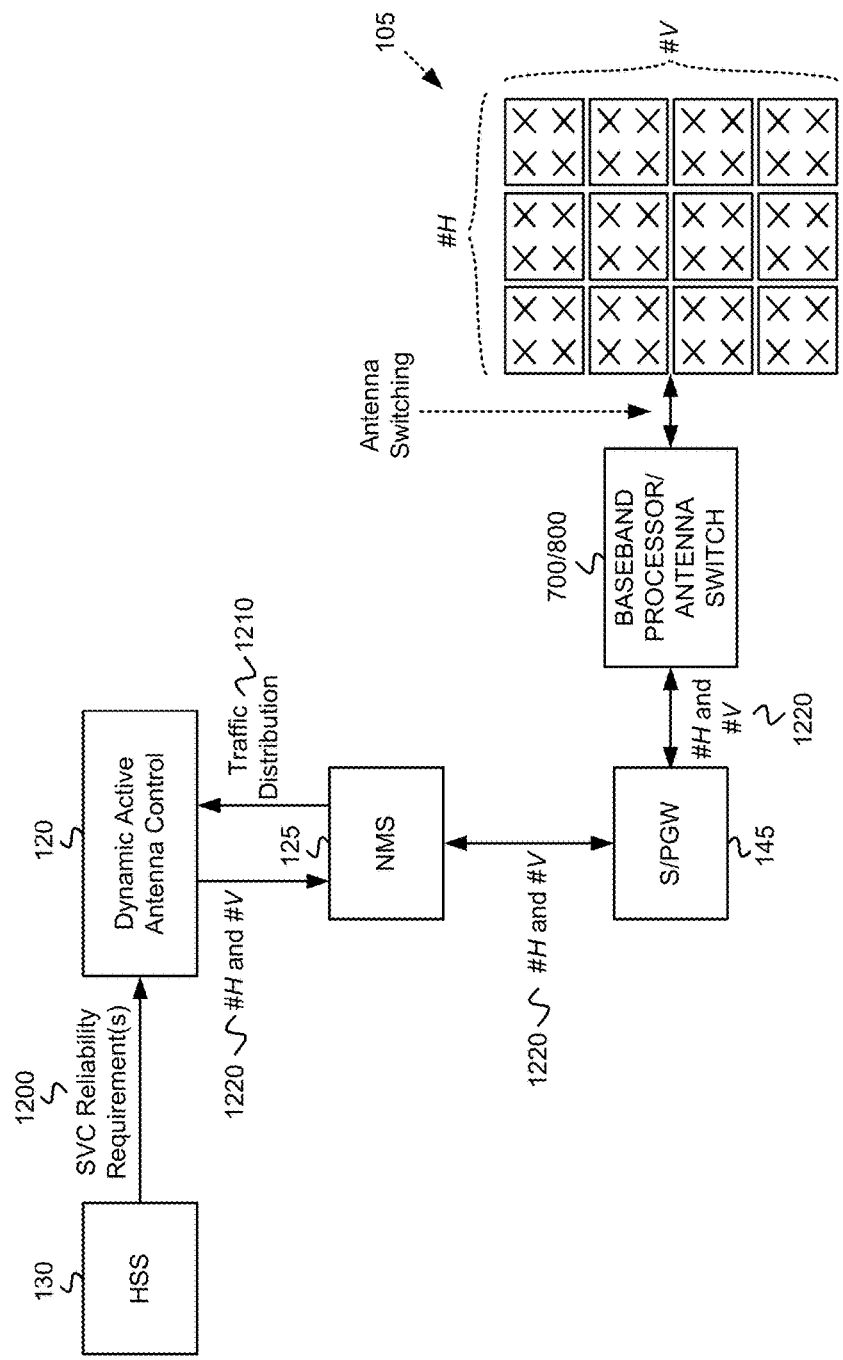
FIG. 12 depicts an example of components of the network environment of FIG. 1 engaged in performing the exemplary process of FIGS. 11A and 11B.

If M_Cap and M_Rel exceed the demand (YES—block 1115), then dynamic active antenna control node 120 determines a required number of horizontal antennas (#H) and a number of vertical antennas (#V) for the antenna site based on a current traffic distribution, reported from NMS 125, and a current service reliability requirement, reported from HSS 130, where #H≤H_Max and #V≤V_Max (block 1125). M_Cap and M_Rel exceed the demand when the bandwidth associated with the current traffic demand is not greater than the available bandwidth of the antenna array 105 and when the current traffic demand does not cause the performance of the antenna array 105 to fail to satisfy the maximum service reliability M_Rel. Dynamic active antenna control 120 receives a report of a current traffic distribution within the geographic coverage area serviced by the antenna array 105 from NMS 125. Dynamic active antenna control 120 also receives a report of a current service reliability requirement reported from HSS 130. The current service reliability requirement may be reported as a percentage of time that data can be transmitted from the antenna array 105 at a required throughput, latency, and/or a maximum number of dropped calls, across a coverage area associated with the antenna array 105. As an example, a current service reliability requirement may include that 99.99% of data be transmitted, via the antenna array 105, with a maximum of 100 ms of latency, a minimum throughput of 1 Mbps and/or with less than 1% of dropped calls. In one implementation, the required number of horizontal antennas (#H) may be determined as being proportional (i.e., not necessarily equal) to horizontal traffic demands within the geographic coverage area of the antenna array 105, and the required number of vertical antennas (#V) may be determined as being proportional (i.e., not necessarily equal) to vertical traffic demands within the geographic coverage area of the antenna array 105. FIG. 12 depicts service reliability requirements 1200 being reported from HSS 130 to dynamic active antenna control node 120, and current traffic distribution 1210 being reported from NMS 125 to dynamic active antenna control 120.

Dynamic active antenna control node 120 decrements the required number of horizontal antennas #H and the required number of vertical antennas #V: #H=#H−1 and #V=#V−1 (block 1130). To decrement the number of antennas, dynamic active antenna control node 120 sends a control signal, either directly or indirectly via intervening nodes, to switch 800 to cause switch 800 to switch out (i.e., disconnect from the antenna array 105) one of the vertical antennas and one of the horizontal antennas. FIG. 12 depicts dynamic active antenna control node 120 sending a control signal 1220, via NMS 125 and S/PGW 145 to cause baseband processor 700 and/or antenna switch 800 to switch out the necessary antenna(s) to decrement the antenna array 105 by a horizontal antenna (#H) and a vertical antenna (#V).

Dynamic active antenna control node 120 determines a capacity (Cap) and reliability (Rel) based on #H and #V (block 1135). Based on the known characteristics of each antenna of each antenna base block 200 and the current size of the antenna array 105 (#H and #V), the current capacity Cap and the current reliability Rel may be calculated. The current capacity may be based on the available bandwidth of each antenna of each antenna base block 200, and the number of antennas that are active (i.e., switched into the antenna array) in the antenna base blocks 200 of the antenna array 105. The current reliability may be based on the known throughput and/or latency of each antenna of each antenna base block 200, including the number of antennas that are active (i.e., switched into the antenna array) in the antenna base blocks 200 of the antenna array 105. The current service reliability Rel may be specified as a percentage of time that data can be transmitted from the antenna array 105 at a required throughput, latency, and/or a maximum number of dropped calls, across a coverage area associated with the antenna array 105. For example, the current service reliability Rel may be that 99.99% of data is transmitted, via the antenna array 105, with a maximum of 100 ms of latency, a minimum throughput of 1 Mbps and/or with less than 1% of dropped calls.

Dynamic active antenna control node 120 determines if Cap and Rel are less than the demand (block 1140). Dynamic active antenna control node 120 performs a comparison of the current demand with the current Cap and Rel (determined in block 1135) to determine if Cap and/or Rel are less than the demand. Dynamic active antenna control node 120 may obtain a real time report of traffic demand, for the geographic coverage area of the antenna array 105, from NMS 125. In one implementation, NMS 125 may periodically "push" a report of current, real-time traffic demand to dynamic active antenna control node 120. In another implementation, dynamic active antenna control node 120 may, on-demand, "pull" a report of current, real-time traffic demand from NMS 125. The current traffic demand exceeds Cap and Rel when the bandwidth associated with the current traffic demand is greater than the available bandwidth of the antenna array 105, and when the current traffic demand causes the performance of the antenna array 105 to fail to satisfy the service reliability requirement Rel.

If Cap and Rel are not less than the demand (NO—block 1140), then the exemplary process returns to block 1130 with another decrementation of #H and #V. If Cap and Rel are less than the demand (YES—block 1140), then the required number of horizontal antennas #H and the required number of vertical antennas #V are incremented: #H=#H+1 and #V=#V+1 (block 1145). When incrementing the number of vertical and horizontal antennas, dynamic active antenna control node 120 sends a control signal to cause an appropriate vertical antenna(s) and an appropriate horizontal antenna(s) to be switched into the antenna array 105 (i.e., connected into the antenna array 105) such that antenna array 105 consists of the incremented #H and #V. Referring again to FIG. 12, a control signal, similar to control signal 1220 previously described, may be sent via NMS 125 and S/PGW 145 to cause baseband processor 700 and/or antenna switch 800 to switch out the necessary antenna(s) to increment the antenna array 105 by a horizontal antenna (#H) and a vertical antenna (#V).

Subsequent to execution of block 1145, the exemplary process may, immediately or after the delay of a certain period of time, return to block 1125 for a re-determination of a required number of horizontal antennas and a required number of vertical antennas based on the reported current traffic distribution and the current service reliability requirement. Therefore, blocks 1125, 1130, 1135, 1140 and 1145 may be periodically, or continuously, repeated to selectively switch in, or out, individual antennas, or entire antenna base blocks 200, of the antenna array 105 based on current traffic distributions and service reliability requirements.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 11A and 11B, the order of the blocks may be varied in other implementations. Moreover, non-dependent blocks may be performed in parallel. The exemplary process of FIGS. 11A and 11B has been described herein as automatically switching in, or switching out, antenna base blocks, and/or individual antennas of the antenna base blocks of an antenna array based on commands received from dynamic active antenna control node 120. In other embodiments, however, the switching in, or switching out, of the antenna base blocks and/or individual antennas of the antenna array may be performed manually (e.g., via maintenance personnel) based on a report(s) generated by dynamic active antenna control node 120.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
    determining, based on physical constraints, a maximum number of a plurality of antenna base blocks that can be placed at a full-dimension multiple input multiple output (FD-MIMO) antenna site, wherein each of the plurality of antenna base blocks comprises a plurality of antennas;
    receiving, from a network management system (NMS), a first traffic distribution associated with the FD-MIMO antenna site;
    receiving a first service reliability requirement associated with the FD-MIMO antenna site;
    determining a first number of antennas to switch into the FD-MIMO antenna site based on the determined maximum number of the plurality of antenna base blocks, the first traffic distribution, and the first service reliability requirement; and
    switching the first number of antennas into the FD-MIMO antenna site.

2. The method of claim 1, wherein determining the first number of antennas comprises:
    determining a first number of antenna base blocks to switch into the FD-MIMO antenna site.

3. The method of claim 2, wherein each of the first number of antenna base blocks comprises a modular antenna array assembly having a same number of vertical antennas and a same number of horizontal antennas (V×H).

4. The method of claim 3, wherein each of the first number of antenna base blocks further includes its own transmitter, receiver and power amplifier.

5. The method of claim 3, wherein the determined first number of antennas to switch into the FD-MIMO antenna site is proportional to vertical and horizontal traffic demands within a geographic coverage area serviced by the FD-MIMO antenna site.

6. The method of claim 1, further comprising:
    receiving, from the NMS, a second traffic distribution associated with the FD-MIMO antenna site;
    receiving a second service reliability requirement associated with the FD-MIMO antenna site;
    determining a second number of antennas to insert into the FD-MIMO antenna site based on the determined maximum number of the plurality of antenna base blocks, the second traffic distribution, and the second service reliability requirement; and
    switching the second number of antennas into the FD-MIMO antenna site.

7. The method of claim 1, further comprising:
    determining a maximum achievable capacity and a maximum achievable reliability based on the determined maximum number of the plurality of antenna base blocks that can be placed at the FD-MIMO antenna site;
    comparing current traffic demand at the FD-MIMO antenna site against the determined maximum achievable capacity and the maximum achievable reliability; and
    adjusting a placement area of the FD-MIMO antenna site based on the comparison.

8. The method of claim 1, further comprising:
    determining a current capacity and a current reliability, associated with the FD-MIMO antenna site, based on the determined first number of antennas switched into the FD-MIMO antenna site;
    comparing current traffic demand at the FD-MIMO antenna site against the determined current capacity and the determined current reliability; and
    adjusting a number of the determined first number of antennas based on the comparison.

9. A network device, comprising:
    a communication interface configured to connect to a network and to:

receive, from a network management system (NMS), a first traffic distribution associated with the FD-MIMO antenna site, and receive, from a server, a first service reliability requirement associated with the FD-MIMO antenna site; and a processing unit configured to:

determine, based on physical constraints, a maximum number of a plurality of antenna base blocks that can be placed at a full-dimension multiple input multiple output (FD-MIMO) antenna site, wherein each of the plurality of antenna base blocks comprises a plurality of antennas, determine a first number of antennas to switch into the FD-MIMO antenna site based on the determined maximum number of the plurality of antenna base blocks, the first traffic distribution, and the first service reliability requirement, and cause the first number of antennas to be switched into the FD-MIMO antenna site.

10. The network device of claim 9, wherein, when determining the first number of antennas, the processing unit is configured to:

determine a first number of antenna base blocks to switch into the FD-MIMO antenna site.

11. The network device of claim 10, wherein each of the first number of antenna base blocks comprises a modular antenna array assembly having a same number of vertical antennas and a same number of horizontal antennas (V×H) and wherein each of the first number of antenna base blocks includes its own transmitter, receiver and power amplifier.

12. The network device of claim 11, wherein the determined first number of antennas to switch into the FD-MIMO antenna site is proportional to vertical and horizontal traffic demands within a geographic coverage area serviced by the FD-MIMO antenna.

13. The network device of claim 9, wherein the communication interface is further configured to:

receive, from the NMS, a second traffic distribution associated with the FD-MIMO antenna site;

receive, from the server, a second service reliability requirement associated with the FD-MIMO antenna site, and wherein the processing unit is further configured to:

determine a second number of antennas to insert into the FD-MIMO antenna site based on the determined maximum number of the plurality of antenna base blocks, the second traffic distribution, and the second service reliability requirement, and cause the second number of antennas to be switched into the FD-MIMO antenna site.

14. The network device of claim 9, wherein the processing unit is further configured to:

determine a maximum achievable capacity and a maximum achievable reliability based on the determined maximum number of the plurality of antenna base blocks that can be placed at the FD-MIMO antenna site, compare current traffic demand at the FD-MIMO antenna site against the determined maximum achievable capacity and the maximum achievable reliability, and adjust a placement area of the FD-MIMO antenna site based on the comparison.

15. The network device of claim 9, wherein the processing unit is further configured to:

determine a current capacity and a current reliability, associated with the FD-MIMO antenna site, based on the determined first number of antennas switched into the FD-MIMO antenna site, compare current traffic demand at the FD-MIMO antenna site against the determined current capacity and the determined current reliability, and adjust a number of the determined first number of antennas based on the comparison.

16. A non-transitory storage medium storing instructions executable by a network device, wherein the instructions comprise instructions to cause the network device to:

determine, based on physical constraints, a maximum number of a plurality of antenna base blocks that can be placed at a full-dimension multiple input multiple output (FD-MIMO) antenna site, wherein each of the plurality of antenna base blocks comprises a plurality of antennas;

receive, from a network management system (NMS), a first traffic distribution associated with the FD-MIMO antenna site;

receive a first service reliability requirement associated with the FD-MIMO antenna site;

determine a first number of antennas to switch into the FD-MIMO antenna site based on the determined maximum number of the plurality of antenna base blocks, the first traffic distribution, and the first service reliability requirement; and switch the first number of antennas into the FD-MIMO antenna site.

17. The non-transitory storage medium of claim 16, wherein, when determining the first number of antennas, the instructions further comprise instructions to cause the network device to:

determine a first number of antenna base blocks to switch into the FD-MIMO antenna site.

18. The non-transitory storage medium of claim 17, wherein each of the first number of antenna base blocks comprises a modular antenna array assembly having a same number of vertical antennas and a same number of horizontal antennas (V×H).

19. The non-transitory storage medium of claim 18, wherein each of the first number of antenna base blocks includes its own transmitter, receiver and power amplifier.

20. The non-transitory storage medium of claim 16, wherein the instructions further comprise instructions to cause the network device to:

determine a maximum achievable capacity and a maximum achievable reliability based on the determined maximum number of the plurality of antenna base blocks that can be placed at a full-dimension multiple input multiple output (FD-MIMO) antenna site;

compare current traffic demand at the FD-MIMO antenna site against the determined maximum achievable capacity and the maximum achievable reliability; and adjust a placement area of the FD-MIMO antenna site based on the comparison.

* * * * *